(12) United States Patent
Coers et al.

(10) Patent No.: US 7,992,369 B2
(45) Date of Patent: Aug. 9, 2011

(54) AGRICULTURAL HARVESTER AND HEADER HEIGHT CONTROL SYSTEM

(75) Inventors: Bruce Alan Coers, Hillsdale, IL (US); Ryan Patrick Mackin, Milan, IL (US); Joseph G. Harman, Ann Arbor, MI (US); Terry R. Warner, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/608,516

(22) Filed: Oct. 29, 2009

(65) Prior Publication Data

US 2011/0099962 A1    May 5, 2011

(51) Int. Cl.
*A01D 41/14* (2006.01)
(52) U.S. Cl. .................................................. 56/10.2 E
(58) Field of Classification Search ... 56/10.2 D–10.2 F, 56/10.2 R, DIG. 15; 172/2–11; 701/50
See application file for complete search history.

(56) References Cited

U.S. PATENT DOCUMENTS

| | | | | |
|---|---|---|---|---|
| 4,414,792 A * | 11/1983 | Bettencourt et al. | ........ | 56/10.2 E |
| 4,573,124 A * | 2/1986 | Seiferling | ........ | 701/50 |
| 5,155,984 A * | 10/1992 | Sheehan | ........ | 56/10.2 E |
| 5,794,421 A * | 8/1998 | Maichle | ........ | 56/10.2 E |
| 6,826,894 B2 * | 12/2004 | Thiemann et al. | ........ | 56/10.2 E |

* cited by examiner

*Primary Examiner* — Robert E Pezzuto

(57) ABSTRACT

An agricultural harvester comprises an agricultural harvester vehicle and a harvesting head mounted on the vehicle, the header height control system including at least one sensor disposed to sense the height of the ground in the path of a drive wheel of the agricultural harvester vehicle, and a header height control system including an electronic circuit configured to lower the harvesting head as a wheel or wheels approach or engage a protrusion on the ground indicated by the sensor, and to raise the harvesting head as the wheels approach or engage a depression in the ground indicated by the sensor.

19 Claims, 3 Drawing Sheets

AGRICULTURAL HARVESTER AND HEADER HEIGHT CONTROL SYSTEM

FIELD OF THE INVENTION

The invention relates to agricultural harvesters. More particularly it relates to implements for agricultural harvesters such as harvesting heads. Even more particularly it relates to systems for controlling the height of harvesting heads or headers.

BACKGROUND OF THE INVENTION

Agricultural harvesters are configured to travel through an agricultural field, cutting the crop plants loose from the field and gathering them. They typically include mechanical members on the harvesting head that are spaced extremely closely to the ground.

This cut crop material is swept into the harvesting head, which carries the cut crop material into a feederhouse (which supports the harvesting head on the front of the agricultural harvester) and into an agricultural harvester for further threshing, separating, and cleaning.

One problem with these systems is their inability to accurately follow the ground contours. The harvesting head follows the ground by being raised or lowered with respect to the agricultural harvester vehicle (and therefore with respect to the ground) to maintain a constant ground clearance of the harvesting head above the ground and above any protrusions extending upward therefrom, such as branches, rocks, mounds of earth, etc.

A particular problem is the response of the agricultural harvester when the wheels of the vehicle travel over protrusions of the ground. When this occurs, the wheels lift the agricultural vehicle. The agricultural vehicle, in turn, lifts the harvesting head higher above the ground.

It is an object of this invention to provide a header height control system that will control the height of the harvesting head in response to (or in anticipation of) the wheels of the combine rising up over a protrusion of the ground or falling down into a depression of the ground

SUMMARY OF THE INVENTION

The agricultural harvester includes a header height control system that is configured to lower the header when the drive wheels reach (or are about to reach) and roll over a protrusion on the ground that would otherwise lift the header to high in the air.

The header height control system is also configured to raise the header when the drive wheels reach (or are about to reach) and roll into a depression on the ground that would otherwise lower the header closer to the ground.

Sensors may be provided on the harvesting head that respond to changing ground terrain by raising the harvesting head when a protrusion reaches the harvesting head.

The same sensors (or other sensors) that sense the presence of the protrusion (or depression) in the path of the drive wheels can be used to perform the opposite action in response to the protrusion (or depression), e.g. lowering (or raising) the harvesting head with respect to the agricultural harvester vehicle just before, or at the same time the drive wheels reach the protrusion (or depression) respectively. Sensors can be mounted in front of both drive wheels, and thus respond to protrusions (or depressions) under one or both of the drive wheels.

Separate actuators may be provided to lower (or lift) one side of the harvesting head or the other side of the harvesting head based upon which wheel on which side of the vehicle is determined by the sensors to roll over the protrusion (or fall into the depression), respectively.

The system overall may function by raising (or lowering) the harvesting head as the protrusion (or depression) passes underneath the harvesting head and engages sensors underneath the harvesting head, then, after a time delay sufficient to let the protrusion (or depression) travel rearward until it engages (or is about to engage) the drive wheels (or wheels), performed the reverse function of lowering (or raising) the harvesting head with respect to the agricultural harvester vehicle, respectively.

In accordance with a first aspect of the invention, an agricultural harvester is provided, the harvester having an agricultural harvester vehicle supported on drive wheels, an agricultural harvesting head attached to a front end thereof, at least one actuator coupled to the vehicle and to the harvesting head and configured to raise and lower the harvesting head with respect to the vehicle, at least a first sensor coupled to the vehicle or the harvesting head to sense a distance to the ground in a path of the drive wheels, and an electronic circuit configured to receive distance signals from the first sensor and to control the at least one actuator to regulate the height of the harvesting head with respect to the vehicle, wherein the electronic circuit is configured to lower the harvesting head with respect to the vehicle when the first sensor indicates a protrusion of the ground in the path of the drive wheels, and is configured to raise the harvesting head with respect to the vehicle when the first sensor indicates a depression of the surface of the ground in the path of the drive wheels.

The electronic circuit may be configured to lower the harvesting head with respect to the vehicle a first predetermined time period after it receives a signal from the first sensor indicating the protrusion of the ground in the path of the drive wheels, and the electronic circuit may be configured to raise the harvesting head with respect to the vehicle a second predetermined time period after it receives a signal from the first sensor indicating the depression of the ground in the path of the drive wheels.

The agricultural harvester may further comprise a second sensor disposed to sense a distance between the harvesting head and the ground, and the electronic circuit may be configured to lower the harvesting head with respect to the vehicle when the second sensor indicates a depression of the surface of the ground, and may also be configured to raise the harvesting head with respect to the vehicle when the first sensor indicates a depression of the surface of the ground in the path of the drive wheels.

The agricultural harvester may further comprise at least one hydraulic valve coupled between the electronic circuit and the at least one actuator, wherein the electronic circuit may be configured to signal the at least one hydraulic valve to lower the harvesting head at a point in time after and in response to the first sensor indicating the protrusion to the electronic circuit, and before the drive wheels engage the protrusion.

The agricultural harvester may further comprise at least one hydraulic valve coupled between the electronic circuit and the at least one actuator, wherein the electronic circuit may be configured to signal the at least one hydraulic valve to raise the harvesting head at a point in time after and in response to the first sensor indicating the depression to the electronic circuit, and before the drive wheels engage the depression.

The agricultural harvester may further comprise at least one hydraulic valve coupled between the electronic circuit and the at least one actuator, wherein the electronic circuit is configured to signal the at least one hydraulic valve to lower the harvesting head at a point in time after and in response to the first sensor indicating an up-rising of the ground to the electronic circuit, and before the drive wheels engage the up-rising.

The agricultural harvester may further comprise at least one hydraulic valve coupled between the electronic circuit and the at least one actuator, wherein the electronic circuit may be configured to signal the at least one hydraulic valve to raise the harvesting head at a point in time after and in response to the first sensor indicating a down-falling of the ground to the electronic circuit, and before the drive wheels engage the down-falling.

In accordance with a second aspect of the invention, a header height control system for an agricultural harvester is provided, the harvester having an agricultural harvester vehicle supported on drive wheels, an agricultural harvesting head attached to a front end thereof, at least one actuator coupled to the vehicle and the harvesting head configured to raise and lower the harvesting head with respect to the vehicle, and at least a first sensor coupled to the vehicle or the harvesting head to sense a distance to the ground in a path of the drive wheels, the header height control system comprising an electronic circuit configured to receive distance signals from the first sensor and to control the at least one actuator to regulate the height of the harvesting head with respect to the vehicle, wherein the electronic circuit is configured to lower the harvesting head with respect to the vehicle when the first sensor indicates a protrusion of the ground in the path of the drive wheels, and is configured to raise the harvesting head with respect to the vehicle when the first sensor indicates a depression of the surface of the ground in the path of the drive wheels.

The electronic circuit may be configured to lower the harvesting head with respect to the vehicle a first predetermined time period after it receives a signal from the first sensor indicating the protrusion of the surface of the ground in the path of the drive wheels, and the electronic circuit may be configured to raise the harvesting head with respect to the vehicle a second predetermined time period after it receives a signal from the first sensor indicating the depression of the surface of the ground in the path of the drive wheels.

The header height control system may further comprise a second sensor disposed to sense a distance from the harvesting head to the ground, and the electronic circuit may be configured to lower the harvesting head with respect to the vehicle when the second sensor indicates a depression of the surface of the ground, and maybe configured to raise the harvesting head with respect to the vehicle when the first sensor indicates a depression of the surface of the ground in the path of the drive wheels.

The agricultural harvester may further include at least one hydraulic valve configured to be coupled between the electronic circuit and the at least one actuator, and the electronic circuit may be configured to signal the at least one hydraulic valve to lower the harvesting head at a point in time after and in response to the first sensor indicating the protrusion to the electronic circuit, and before the drive wheels engage the protrusion.

The agricultural harvester may further include at least one hydraulic valve configured to be coupled between the electronic circuit and the at least one actuator, and the electronic circuit may be configured to signal the at least one hydraulic valve to raise the harvesting head at a point in time after and in response to the first sensor indicating the depression to the electronic circuit, and before the drive wheels engage the depression.

The agricultural harvester may further include at least one hydraulic valve coupled between the electronic circuit and the at least one actuator, and the electronic circuit may be configured to signal the at least one hydraulic valve to lower the harvesting head at a point in time after and in response to the first sensor indicating an up-rising of the ground to the electronic circuit, and before the drive wheels engage the up-rising.

The agricultural harvester may further include at least one hydraulic valve coupled between the electronic circuit and the at least one actuator, and wherein the electronic circuit is configured to signal the at least one hydraulic valve to raise the harvesting head at a point in time after and in response to the first sensor indicating a down-falling of the ground to the electronic circuit, and before the drive wheels engage the down-falling.

The agricultural harvester may further comprise at least a second sensor coupled to the vehicle or the harvesting head to sense a distance to the ground in a second path of a second drive wheel different from the path of a drive wheel sensed by the first sensor, and the electronic circuit may be configured to receive distance signals from the second sensor and to control the at least one actuator to regulate the height of the harvesting head with respect to the vehicle, wherein the electronic circuit is configured to lower the harvesting head with respect to the vehicle when the second sensor indicates a protrusion of the ground in the second path of the second drive wheel, and is configured to raise the harvesting head with respect to the vehicle when the second sensor indicates a depression of the surface of the ground in the second path of the second drive wheel.

The agricultural harvester may further include at least a second sensor coupled to the vehicle or the harvesting head to sense a distance to the ground in a second path of a second drive wheel different from the path of a drive wheel sensed by the first sensor, and the electronic circuit may be configured to receive distance signals from the second sensor and to control the at least one actuator to regulate the height of the harvesting head with respect to the vehicle, wherein the electronic circuit is configured to lower the harvesting head with respect to the vehicle when the second sensor indicates a protrusion of the ground in the second path of the second drive wheel, and is configured to raise the harvesting head with respect to the vehicle when the second sensor indicates a depression of the surface of the ground in the second path of the second drive wheel.

DESCRIPTION OF THE PREFERRED EMBODIMENT

In the description below, the term "protrusion" shall refer to an upwardly extending feature of the ground or of an object lying thereon or extending therefrom, which will lift the agricultural harvester when its drive wheels or drive tracks pass over the protrusion. Protrusions can include such things as branches, rocks, boulders, stumps, and sharply irregular ground surfaces such as ridges, for example.

In the description below the term "depression" shall refer to a locally depressed portion of the ground, such as a pit, hole, rut, groove, or ditch, for example.

In the description below, an "up-rising" or "down-falling" of the ground can refer to a protrusion, depression, or a broader and less sharp rising up or falling down of the ground terrain, such as undulations in the terrain.

In the description below, "forward", "front", "rear", "behind", or any derivatives or synonyms thereof shall refer to relative positions as determined by the normal direction of travel of the agricultural harvester, said direction of travel being generally perpendicular to the longitudinal extent of the harvesting head 104 and which is indicated herein by the arrow identified with the letter "V" in FIG. 1.

Figure 1:
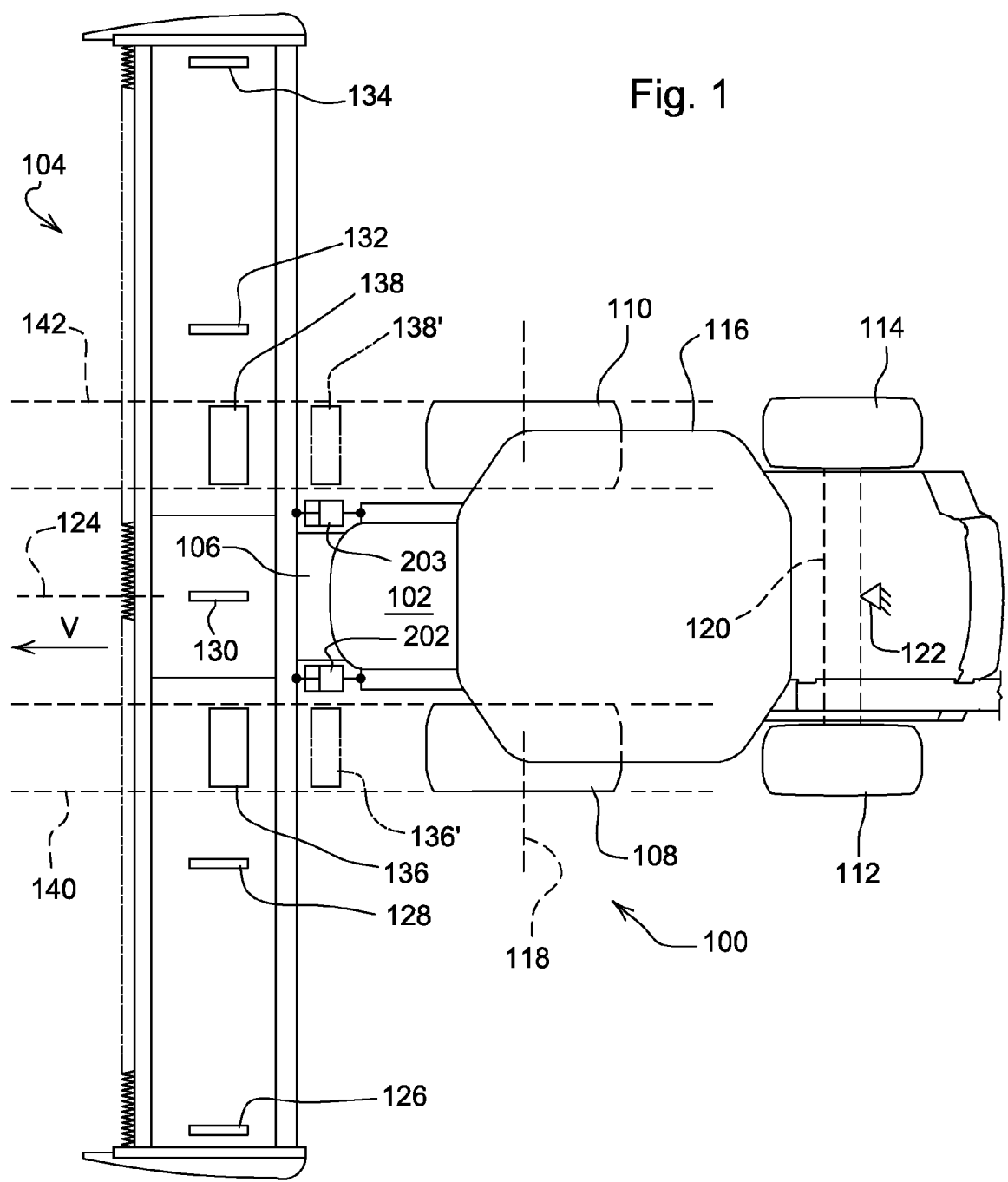
FIG. 1 is a plan view of an agricultural harvester in accordance with the present invention.

In FIG. 1, an agricultural harvester 100 is shown that includes an agricultural harvester vehicle 102 and a harvesting head 104 that is mounted on the front of the vehicle 102 to extend forward therefrom.

Harvesting head 104 is supported on a feederhouse 106 that is pivotally coupled to the front of vehicle 102. By extending or retracting actuators 202, 203, the front end of feederhouse 106 can be raised or lowered. When feederhouse 106 is raised and lowered, it raises and lowers harvesting head 104 with respect to agricultural harvester vehicle 102.

Agricultural harvester vehicle 102 is supported on four wheels, including a left front wheel 108, right front wheel 110, a left rear wheel 112, and a right rear wheel 114. Front wheels 108, 110 are the drive wheels and are typically larger than rear wheels 112, 114. Front wheels 108, 110 extend from chassis 116 of vehicle 102 and rotate about an axis 118 that is fixed with respect to the chassis 116. As front wheels 108, 110 move up and down following irregular ground terrain, they force chassis 116 to also rise up and down. This, in turn, raises and lowers harvesting head 104 with respect to the surface of the field.

Rear wheels 112, 114 are supported on opposing ends of axle 120 which is configured to freely pivot about pivot point 122 as the agricultural harvester is driven over the ground. In this manner, wheels 112, 114 do not tend to tilt the agricultural vehicle 9 or the harvesting head supported thereon) to the right or to the left.

Several distance sensors 126, 128, 130, 132, 134 (also known as height sensors) are provided to sense the distance from the sensor to the ground over which the agricultural harvester is traveling. In the preferred embodiment, shown here, they include elongate members (FIG. 2) with lower ends that drag across the ground. The upper ends of the members are typically coupled to rotary position sensors. As the ground approaches the bottom of the harvesting head 104, the bars rotate the rotary sensors in a first direction (either clockwise or counterclockwise). As the ground recedes or falls away from the bottom of harvesting head 104, the bars rotate the rotary sensors in the opposite direction.

Other sensors may be alternatively employed, such as ultrasonic sensors, radar, or optical sensors, which may be contact or noncontact sensors. Further, the sensors may be electrical, such as linear or rotary potentiometers and rheostats; or digital, such as optical sensors, such as light interrupting disks or light interrupting linear members; or magnetic, such as sensors that sense step changes in magnetic fields in rotating disks or linearly moving members.

As yet another alternative, a sensor may be coupled not to sense the position of the ground directly, but to sense the position indirectly, by sensing the relative pivotal position of a conveyor belt support arm or cutter bar support arm of a harvesting head (e.g. a draper platform) with respect to a frame or subframe of the harvesting head.

In these arrangements the arms are pivotally coupled to the frame of the harvesting head to permit them to move up and down with respect to the frame of the harvesting head and thereby to permit the conveyor belt or cutter bar to move up and down following the contours of the ground more closely. The forward ends of the arms are typically attached to skid plates that "skid" along the surface of the ground. Thus, when the ground rises underneath the harvesting head, the arms are pivoted upward at their forward ends, and when the ground falls away they pivot downward at their forward ends. The sensor could be disposed to sense the pivotal position of these arms and therefore also indicate distance from a frame of the harvesting head to the ground.

In the system of the preceding paragraph, the header height control system does not control the distance between the skid plates and the ground since those arms are resting on and following the ground. Instead, the header height control system controls the height of a frame of the harvesting head with respect to the ground, holding the frame above the ground a controlled distance while permitting the skid plates to skid along the ground. Therefore, even though some portion of the harvesting head rests against the ground, a header height control system can still be said to control the height of the harvesting head above the ground.

Two additional distance sensors 136, 138 are also provided to sense the distance from the sensors 136, 138 (which are preferably located at a lower portion of harvesting head 104) to the ground over which the agricultural harvester is traveling. Distance sensors 136, 138 may be constructed the same as distance sensors 126, 128, 130, 132, 134. Other sensors may be alternatively employed, such as ultrasonic, radar, or optical sensors which may be contact or noncontact sensors. Similarly, sensors 136, 138 may be coupled to the pivoting arms that support a cutter bar or conveyors described above.

Distance sensors 136, 138 may be fixed to the harvesting head or they may be separately mounted behind the harvesting head and on the agricultural harvester vehicle 102. This alternate position for sensors 136 and 138 is shown in FIG. 1 as sensors in positions 136', 138'.

Distance sensors 136, 138 are disposed to sense the distance to the ground along paths 140, 142. Paths 140, 142 are the paths followed by front wheels 108, 110, respectively. Thus, first and second sensors 136, 138 sense the height of the ground (which would include the distance to any protrusion or depression) in first and second paths that first and second front wheels 108, 110, will run over, respectively.

Figure 2:
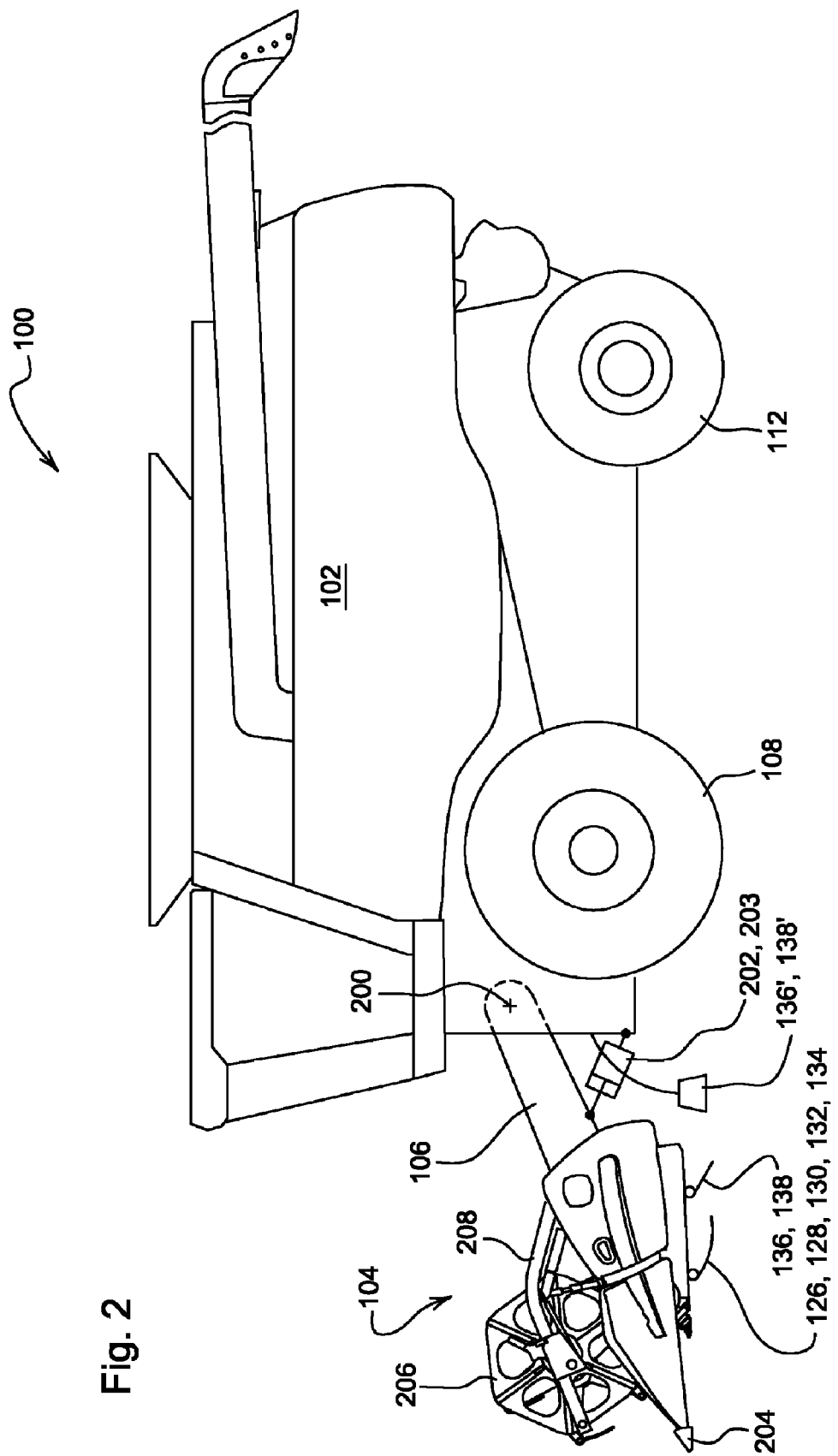
FIG. 2 is a side view of the agricultural harvester of FIG. 1.

In FIG. 2, a left side view of agricultural harvester 100 is shown together with details of harvesting head 104. In particular, harvesting head 104 is supported on feederhouse 106, which is pivotally coupled to the front of agricultural harvester vehicle 102 to pivot about horizontally and laterally extending pivotal axis 200.

Harvesting head 104 is supported in its vertical position by actuators, here shown as hydraulic cylinders 202, 203, that pivot feederhouse 106 up and down with respect to vehicle 102. When actuators 202, 203 extend, they raise the front portion of feederhouse 106 with respect to agricultural harvester vehicle 102, pivoting the harvesting head upward with respect to agricultural harvester vehicle 102 about axis 200. When actuators 202, 203 retract, they lower the front portion of feederhouse 106 with respect to agricultural harvester vehicle 102.

Harvesting head 104 includes an elongate laterally extending reciprocating knife 204 that is fixed to and extends forward from the lower front portion of harvesting head 104.

This reciprocating knife severs the stalks of the crop plants adjacent to the ground along the leading edge of harvesting head 104. Harvesting head 104 also includes an elongate reel 206 that is supported for rotation on reel arms 208. Reel 206 rotates as agricultural harvester 100 travels through the field, contacting the upper portions of the crop plants and directing them rearward into the harvesting head as their stalks are severed by reciprocating knife 204. One or more lateral conveyors, such as draper belts or rotary augers, carry the severed crop plants inward toward the longitudinal axis 124 (FIG. 1) of the agricultural harvester 100, whereupon the crop plants are changed in direction by 90 degrees, and are carried rearward through feederhouse 106 and into vehicle 102 for storage or further processing.

Figure 3:
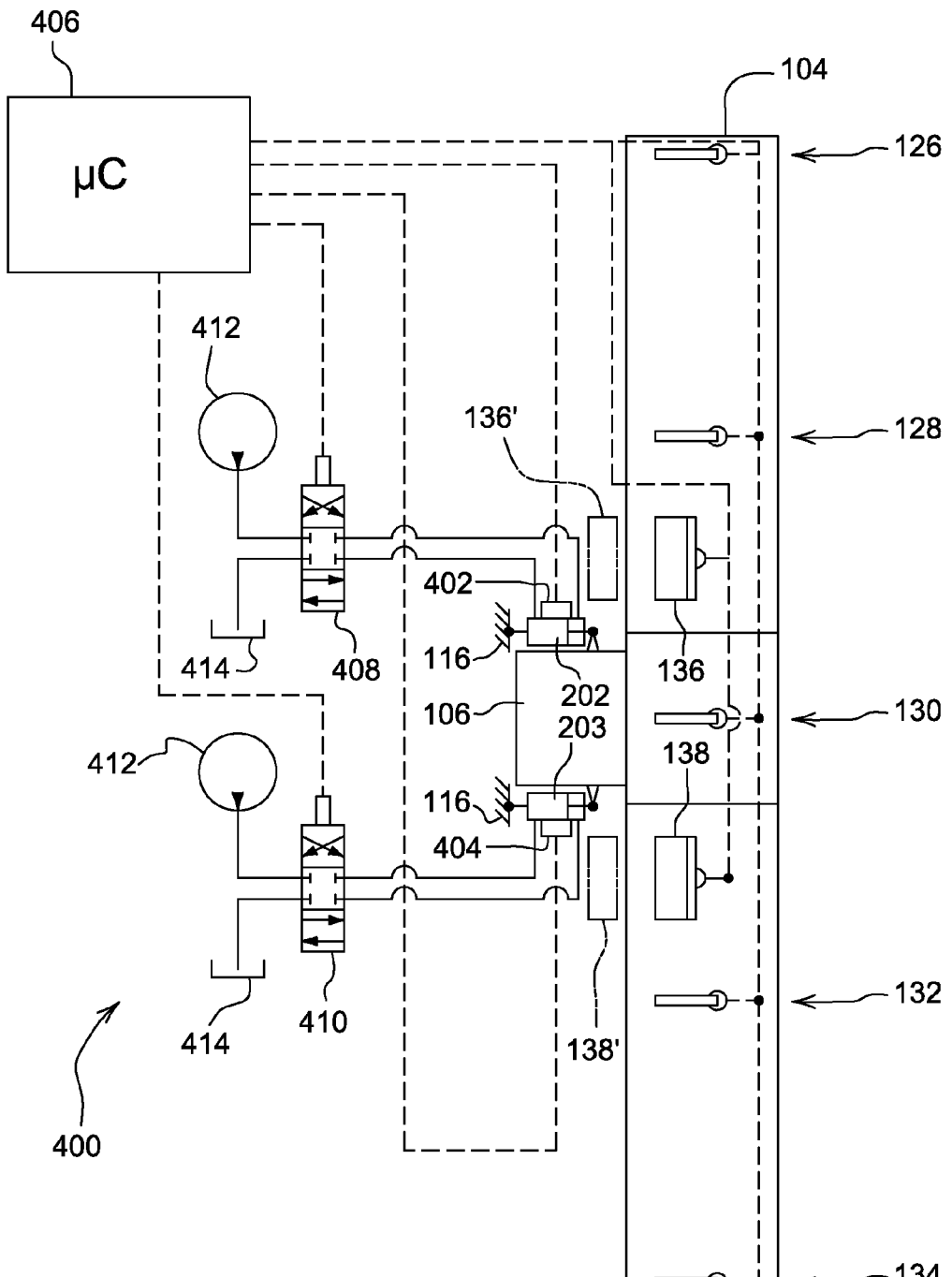
FIG. 3 is a schematic diagram of a header height control system for the agricultural harvester of FIGS. 1-2.

Referring now to FIG. 3, header height control system 400 is shown in conjunction with feederhouse 106 and harvesting head 104. The height sensors 126, 128, 130, 132, 134, 136, 138 and actuators 202, 203 of the header height control system are also shown.

The header height control system 400 further includes position sensors 402, 404 which are disposed to sense the position of harvesting head 104, in particular, by sensing the position of actuators 202, 203. The position sensors 402, 404 may alternatively be located on the chassis 116, on the feederhouse 106, or on the harvesting head 104.

Since the harvesting head 104 is positioned by actuators 202, 203, a signal indicating the relative extension (i.e. the position) of actuators 202, 203 also indicates the height of the harvesting head 104 with respect to agricultural harvester vehicle 102.

An electronic circuit includes microcontroller 406. Microcontroller 406 is provided as part of the header height control system 400 to receive signals from the sensors and to determine the appropriate control actions to be performed by hydraulic valves 408, 410 to which microcontroller 406 is coupled and drives. Hydraulic valves 408, 410 are coupled to and receive hydraulic fluid under pressure from hydraulic supply 412, and selectively direct that hydraulic fluid under pressure to the extend and retract ports of actuators 202, 203. This flow of hydraulic fluid under pressure causes actuators 202, 203 to extend or retract. Hydraulic valves 408, 410 are coupled to and transmit hydraulic fluid back from the extend and retract ports of actuators 202, 203 to low-pressure hydraulic reservoir 414.

In normal operation, the ground terrain changes under harvesting head 104, which causes the height sensors 126, 128, 130, 132, 134 to indicate that the harvesting head 104 is closer to or farther from the ground. Microcontroller 406 receives the signals and calculates an appropriate error correction signal that it transmits to valves 408, 410, signaling them to lift or lower harvesting head 104 by extending or retracting (respectively) actuators 202, 203 as necessary to maintain a constant clearance between the harvesting head and the ground.

As the ground terrain changes, this process is performed continuously by microcontroller 406 causing the harvesting head 104 to stay at a relatively constant distance to the surface of the ground.

In some prior art arrangements, these five sensors are replaced with a single sensor coupled to an elongate member that extends across substantially the entire width of the harvesting head. In this manner, the single sensor indicates the smallest distance between the ground and the harvesting head over the entire width of the harvesting head.

In other arrangements, height sensors are provided only on the extreme lateral ends of the harvesting head to sense the height at each end of the harvesting head.

In other arrangements, such as that shown here, several sensors are provided to indicate the height of the harvesting head with respect to the ground at several locations across the width of the harvesting head.

The latter multisensor arrangement is preferred, since it permits a microcontroller to perform more careful calculations, and to signal the actuators 202, 203 to (for example) raise or lower the left and right side of the harvesting head simultaneously, thereby accommodating side to side differences in the height of the ground over which the vehicle passes.

In all of these alternative sensor arrangements, however, the actions commanded by microcontroller 406 are the same. When anything pushes the harvesting head mounted sensors upward (i.e. causing them to indicate that there is less ground clearance between the harvesting head and the ground underneath the harvesting head) the automatic header height control system raises the harvesting head with respect to the agricultural harvester at least in the vicinity of that sensor, thereby restoring the harvesting head to its preferred distance with respect to the ground.

The same process is followed in the opposite direction. When the ground falls away underneath the sensor (thereby indicating a greater distance between the harvesting head and the ground) the automatic header height control system lowers the harvesting head with respect to the agricultural harvester, thereby restoring the harvesting head to its preferred distance with respect to the ground.

In the present invention, however, the height sensors 136, 138 (alternatively 136', 138') cause the microcontroller 406 to drive the harvesting head in the opposite direction with respect to the agricultural harvester.

When sensors 136, 138, or 136', 138' sense a reduced distance between the sensor and the ground (for example caused by a branch, rock, or a rising-up of the earth) ahead of the front wheels 108, 110 in paths 140, 142, microcontroller 406 is programmed to lower the harvesting head with respect to the agricultural harvester as the protrusion approaches or begins to lift the front wheels.

Microcontroller 406 is configured to delay this raising or lowering of the harvesting head 104 with respect to the agricultural harvester vehicle 102 based upon the distance between the point on the ground at which sensors 136, 138, 136', 138' sense the distance to the ground and the speed of the vehicle.

When sensors 136, 138 sense a reduced distance, the immediate response of microcontroller 406, as described above, is to raise harvesting head 104 with respect to vehicle 102 in order to increase the ground clearance underneath harvesting head 104 as the protrusion on the ground passes underneath the harvesting head.

Microcontroller 406 subsequently performs the opposite control action by lowering harvesting head 104 with respect to vehicle 102 in order to prevent harvesting head 104 from being raised too high as the protrusion passes under front wheels 108, 110. The faster the agricultural harvester vehicle 102 travels, the faster the protrusion will arrive at front wheels 108, 110, and the faster microcontroller 406 will perform the opposite control action of lowering harvesting head 104.

By signaling the valves before the protrusion arrives at the front wheels, lag time for energizing the valve coils, shifting the valve spools, and conducting hydraulic fluid from the actuators 202, 203 can be reduced.

In a preferred arrangement, microcontroller 406 signals valves 408, 410 to open and begin lowering harvesting head 104 before the protrusion on the ground (sensed by sensors 136, 138, 136' or 138') actually reaches front wheels 108, 110.

By signaling the valves 408, 410 in advance of the protrusion's arrival underneath the front wheels and the agricultural harvester being lifted by the front wheels passing over the protrusion, the typical lag time for energizing the valve coils, shifting the valve spools, and conducting hydraulic fluid into the actuators 202, 203 can be reduced.

In another preferred arrangement, microcontroller 406 signals valves 408, 410 to open and begin raising harvesting head 104 before a depression on the ground (sensed by sensors 136, 138, 136' or 138') actually reaches front wheels 108, 110. It signals the valves 408, 410 in advance of the depression's arrival underneath the front wheels and before the agricultural harvester vehicle 102 is lowered into the depression by the front wheels falling into the depression.

By signaling the valves before the depression arrives at the front wheels, lag time for energizing the valve coils, shifting the valve spools, and conducting hydraulic fluid into the actuators 202, 203 can be reduced.

Thus, microcontroller 406 is configured to apply opposing control actions to raise or lower harvesting head 104 with respect to vehicle 102 based upon whether the distance to the ground indicated by the sensors 126, 128, 130, 132, 134, 136, 138, 136', 138' is measured in a path or paths 140, 142 that is followed by the front wheels of vehicle 102, or whether it is measured away from path or paths 140, 142.

Similarly, microcontroller 406 is configured to apply control actions after a time delay depending upon the lateral location of a sensor with respect to the harvesting head or vehicle 102, and whether the sensor is disposed to measure distance in a path or paths 140, 142.

If sensors 136, 138 (or 136', 138') sense a protrusion in left side path 140, and not right side path 142, microcontroller 406 is configured to selectively energize valve 202 to lower the left side of the harvesting head and not the right side.

If sensors 136, 138 (or 136', 138') sense a protrusion in right side path 142, and not left side path 140, microcontroller 406 is configured to selectively energize valve 203 to lower the right side of the harvesting head and not the left side.

Having described the preferred embodiments, it will become apparent that various modifications can be made without departing from the scope of the invention as defined in the accompanying claims.

The invention claimed is:

1. An agricultural harvester having an agricultural harvester vehicle supported on drive wheels, an agricultural harvesting head attached to a front end thereof, at least one actuator coupled to the vehicle and to the harvesting head and configured to raise and lower the harvesting head with respect to the vehicle, at least a first sensor coupled to the vehicle or the harvesting head to sense a distance to the ground in a path of the drive wheels, and an electronic circuit configured to receive distance signals from the first sensor and to control the at least one actuator to regulate the height of the harvesting head with respect to the vehicle, wherein the electronic circuit is configured to lower the harvesting head with respect to the vehicle when the first sensor indicates a protrusion of the ground in the path of the drive wheels, and is configured to raise the harvesting head with respect to the vehicle when the first sensor indicates a depression of the surface of the ground in the path of the drive wheels.

2. The agricultural harvester in accordance with claim 1, wherein the electronic circuit is configured to lower the harvesting head with respect to the vehicle a first predetermined time period after it receives a signal from the first sensor indicating the protrusion of the surface of the ground in the path of the drive wheels, and wherein the electronic circuit is configured to raise the harvesting head with respect to the vehicle a second predetermined time period after it receives a signal from the first sensor indicating the depression of the surface of the ground in the path of the drive wheels.

3. The agricultural harvester in accordance with claim 1, further comprising a second sensor disposed to sense a distance from the harvesting head to the ground, and wherein the electronic circuit is configured to lower the harvesting head with respect to the vehicle when the second sensor indicates a depression of the surface of the ground, and is configured to raise the harvesting head with respect to the vehicle when the first sensor indicates a depression of the surface of the ground in the path of the drive wheels.

4. The agricultural harvester in accordance with claim 1, further comprising at least one hydraulic valve coupled between the electronic circuit and the at least one actuator, wherein the electronic circuit is configured to signal the at least one hydraulic valve to lower the harvesting head at a point in time after and in response to the first sensor indicating the protrusion to the electronic circuit, and before the drive wheels engage the protrusion.

5. The agricultural harvester in accordance with claim 1, further comprising at least one hydraulic valve coupled between the electronic circuit and the at least one actuator, wherein the electronic circuit is configured to signal the at least one hydraulic valve to raise the harvesting head at a point in time after and in response to the first sensor indicating the depression to the electronic circuit, and before the drive wheels engage the depression.

6. The agricultural harvester in accordance with claim 1, further comprising at least one hydraulic valve coupled between the electronic circuit and the at least one actuator, wherein the electronic circuit is configured to signal the at least one hydraulic valve to lower the harvesting head at a point in time after and in response to the first sensor indicating an up-rising of the ground to the electronic circuit, and before the drive wheels engage the up-rising.

7. The agricultural harvester in accordance with claim 1, further comprising at least one hydraulic valve coupled between the electronic circuit and the at least one actuator, wherein the electronic circuit is configured to signal the at least one hydraulic valve to raise the harvesting head at a point in time after and in response to the first sensor indicating a down-falling of the ground to the electronic circuit, and before the drive wheels engage the down-falling.

8. A header height control system for an agricultural harvester, the harvester having an agricultural harvester vehicle supported on drive wheels, an agricultural harvesting head attached to a front end thereof, at least one actuator coupled to the vehicle and the harvesting head configured to raise and lower the harvesting head with respect to the vehicle, and at least a first sensor coupled to the vehicle or the harvesting head to sense a distance to the ground in a path of the drive wheels, the header height control system comprising:
   an electronic circuit configured to receive distance signals from the first sensor and to control the at least one actuator to regulate the height of the harvesting head with respect to the vehicle, wherein the electronic circuit is configured to lower the harvesting head with respect to the vehicle when the first sensor indicates a protrusion of the ground in the path of the drive wheels, and is configured to raise the harvesting head with respect to the vehicle when the first sensor indicates a depression of the surface of the ground in the path of the drive wheels.

9. The header height control system for an agricultural harvester in accordance with claim 8, wherein the electronic circuit is configured to lower the harvesting head with respect to the vehicle a first predetermined time period after it receives a signal from the first sensor indicating the protrusion of the surface of the ground in the path of the drive wheels, and wherein the electronic circuit is configured to raise the harvesting head with respect to the vehicle a second predetermined time period after it receives a signal from the first sensor indicating the depression of the surface of the ground in the path of the drive wheels.

10. The header height control system for an agricultural harvester in accordance with claim 8, further comprising a second sensor disposed to sense a distance from the harvesting head to the ground, and wherein the electronic circuit is configured to lower the harvesting head with respect to the vehicle when the second sensor indicates a depression of the surface of the ground, and is configured to raise the harvesting head with respect to the vehicle when the first sensor indicates a depression of the surface of the ground in the path of the drive wheels.

11. The header height control system for an agricultural harvester in accordance with claim 8, wherein the agricultural harvester further includes at least one hydraulic valve configured to be coupled between the electronic circuit and the at least one actuator, and wherein the electronic circuit is configured to signal the at least one hydraulic valve to lower the harvesting head at a point in time after and in response to the first sensor indicating the protrusion to the electronic circuit, and before the drive wheels engage the protrusion.

12. The header height control system for an agricultural harvester in accordance with claim 8, wherein the agricultural harvester further includes at least one hydraulic valve configured to be coupled between the electronic circuit and the at least one actuator, wherein the electronic circuit is configured to signal the at least one hydraulic valve to raise the harvesting head at a point in time after and in response to the first sensor indicating the depression to the electronic circuit, and before the drive wheels engage the depression.

13. The header height control system for an agricultural harvester in accordance with claim 8, wherein the agricultural harvester further includes at least one hydraulic valve coupled between the electronic circuit and the at least one actuator, and wherein the electronic circuit is configured to signal the at least one hydraulic valve to lower the harvesting head at a point in time after and in response to the first sensor indicating an up-rising of the ground to the electronic circuit, and before the drive wheels engage the up-rising.

14. The header height control system for an agricultural harvester in accordance with claim 8, wherein the agricultural harvester further includes at least one hydraulic valve coupled between the electronic circuit and the at least one actuator, and wherein the electronic circuit is configured to signal the at least one hydraulic valve to raise the harvesting head at a point in time after and in response to the first sensor indicating a down-falling of the ground to the electronic circuit, and before the drive wheels engage the down-falling.

15. The agricultural harvester of claim 1, further comprising at least a second sensor coupled to the vehicle or the harvesting head to sense a distance to the ground in a second path of a second drive wheel different from the path of a drive wheel sensed by the first sensor, and the electronic circuit is configured to receive distance signals from the second sensor and to control the at least one actuator to regulate the height of the harvesting head with respect to the vehicle, wherein the electronic circuit is configured to lower the harvesting head with respect to the vehicle when the second sensor indicates a protrusion of the ground in the second path of the second drive wheel, and is configured to raise the harvesting head with respect to the vehicle when the second sensor indicates a depression of the surface of the ground in the second path of the second drive wheel.

16. The header height control system for an agricultural harvester in accordance with claim 8, wherein the agricultural harvester further includes at least a second sensor coupled to the vehicle or the harvesting head to sense a distance to the ground in a second path of a second drive wheel different from the path of a drive wheel sensed by the first sensor, and the electronic circuit is configured to receive distance signals from the second sensor and to control the at least one actuator to regulate the height of the harvesting head with respect to the vehicle, wherein the electronic circuit is configured to lower the harvesting head with respect to the vehicle when the second sensor indicates a protrusion of the ground in the second path of the second drive wheel, and is configured to raise the harvesting head with respect to the vehicle when the second sensor indicates a depression of the surface of the ground in the second path of the second drive wheel.

17. A header height control system for an agricultural harvester, the harvester having an agricultural harvester vehicle supported on drive wheels, an agricultural harvesting head attached to a front end thereof, at least one actuator coupled to the vehicle and the harvesting head configured to raise and lower the harvesting head with respect to the vehicle, the system comprising:
 a means for sensing a ground protrusion in the path of at least one drive wheel of the drive wheels, said protrusion disposed to lift the vehicle when said at least one drive wheel rides over said ground protrusion in said path and for generating a protrusion signal corresponding to the distance to said protrusion; and
 an electronic circuit means for receiving distance signals from the means for sensing, and for controlling the at least one actuator to lower the harvesting head with respect to the vehicle when the at least one drive wheel is raised by said protrusion and in response to the protrusion signal.

18. The header height control system of claim 17, wherein the electronic circuit means is configured to lower the harvesting head based upon he protrusion signal a predetermined time after the means for sensing generates the protrusion signal.

19. The header height control system of claim 18, wherein the predetermined time is long enough to permit the protrusion to travel from the means for sensing to the at least one drive wheel.

* * * * *